United States Patent
Dauchy et al.

(10) Patent No.: US 7,417,994 B2
(45) Date of Patent: Aug. 26, 2008

(54) PROTOCOL GATEWAY BETWEEN AN H.323 TERMINAL AND ANOTHER TERMINAL, WITHOUT MASTER ROLE IMPLEMENTATION

(75) Inventors: Philippe Dauchy, Paris (FR); Frédéric Reich, Villabe (FR); Patricia Reymond, Palaiseau (FR)

(73) Assignee: Alcatel, Paris (FR)

( * ) Notice: Subject to any disclaimer, the term of this patent is extended or adjusted under 35 U.S.C. 154(b) by 959 days.

(21) Appl. No.: 10/398,935

(22) PCT Filed: Sep. 5, 2002

(86) PCT No.: PCT/FR02/03014
§ 371 (c)(1),
(2), (4) Date: Apr. 11, 2003

(87) PCT Pub. No.: WO03/024037
PCT Pub. Date: Mar. 20, 2003

(65) Prior Publication Data
US 2003/0189939 A1   Oct. 9, 2003

(51) Int. Cl.
*H04L 12/28* (2006.01)
*H04L 12/56* (2006.01)
(52) U.S. Cl. .................................................. 370/401
(58) Field of Classification Search .............. 370/401, 370/493, 494, 495; 379/900, 93.09
See application file for complete search history.

(56) References Cited

U.S. PATENT DOCUMENTS

| | | | | |
|---|---|---|---|---|
| 5,822,306 A | * | 10/1998 | Catchpole | 370/261 |
| 6,584,110 B1 | * | 6/2003 | Mizuta et al. | 370/401 |
| 6,738,390 B1 | * | 5/2004 | Xu et al. | 370/467 |
| 6,993,012 B2 | * | 1/2006 | Liu et al. | 370/352 |
| 2003/0088421 A1 | * | 5/2003 | Maes et al. | 704/270.1 |

FOREIGN PATENT DOCUMENTS

WO   WO 0076107 A   12/2000

OTHER PUBLICATIONS

Singh and Schulzrinne, "Interworking Between SIP/SDP and H.323", May 12, 2000, published by the Internet Engineering Task Force.*

L-P Anquetil et al, "Media Gateway Control Protocol and Voice Over IP Gateways. MGCP and VOIP Gateways will Offer Seamless Interworking of New VOIP Networks with Today's Telephone Networks", Electrical Communication, Alcatel, Brussels, BE, Apr. 1, 1999, pp. 151-157, XP000830045.

B. Rosen, VOIP Gateways and the Megaco Architecture, BT Technology Journal, BT Laboratories, GB, vol. 19, No. 2, Apr. 1, 2001, pp. 67-76, XP001034589.

* cited by examiner

*Primary Examiner*—Kevin C Harper
(74) *Attorney, Agent, or Firm*—Sughrue Mion, PLLC

(57) ABSTRACT

A protocol gateway for setting up multimedia sessions between a first terminal, using a first protocol (for example H.323), and a second terminal, using a second protocol, said first protocol requiring the determination of a master, which protocol gateway is characterized in that it has available to it means for forcing said first terminal to assume the role of master.

8 Claims, 1 Drawing Sheet

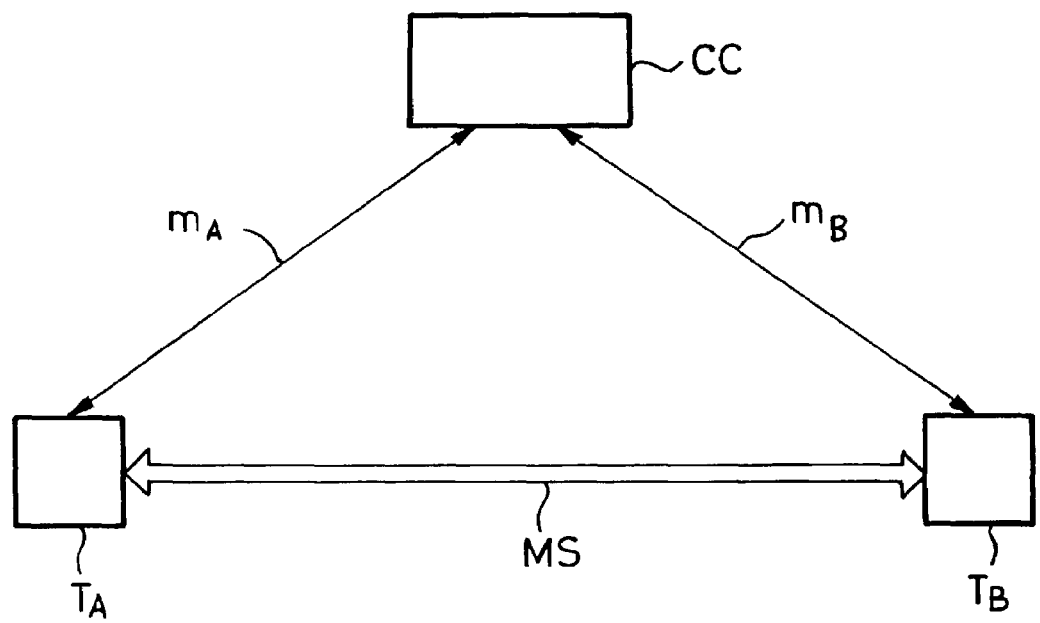
FIG_1
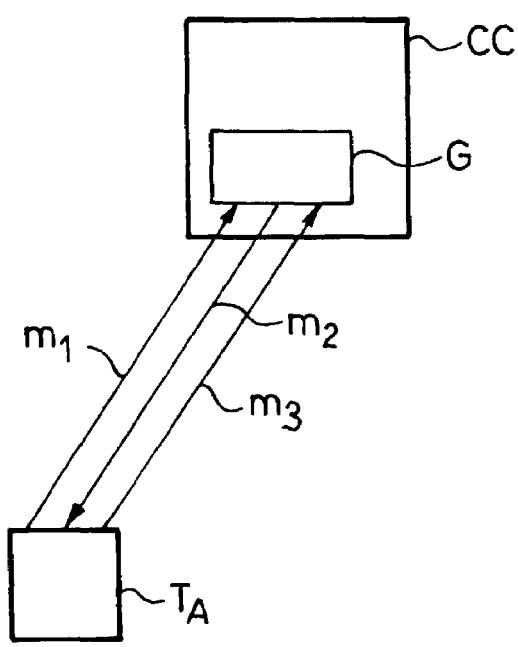
FIG_2

PROTOCOL GATEWAY BETWEEN AN H.323 TERMINAL AND ANOTHER TERMINAL, WITHOUT MASTER ROLE IMPLEMENTATION

BACKGROUND OF THE INVENTION

1. Field of the Invention

The present invention relates to telecommunication networks, and more specifically, it concerns the management of multimedia sessions set up on top of a data network. This data network may be compliant with the TCP/IP (Transmission Control Protocol/Internet Protocol) family of protocols, and it may in particular be the Internet.

2. Description of the Related Art

Hereinafter, "multimedia session" refers to the transmission of data between two or more terminals involving several media types, in particular, most often voice and/or video. These multimedia sessions are commonly called VoIP for Voice over IP (Internet Protocol).

Prior to setting up the actual multimedia session, the terminals involved must exchange information in order to, in particular, set certain parameters of the multimedia session.

These parameters relate, for example, to characteristics of the medium (voice encoding format, video format, etc.). These characteristics may be determined according to the capabilities of the terminals participating in the multimedia session.

This setup phase of the multimedia session takes place in accordance with a particular protocol.

However, these protocols are quite varied. In particular, mention may be made of the H.323 protocol defined by the ITU-T (International Telecommunication Union Telecommunication Standardization Sector) and the SIP (Session Initiation Protocol) defined by RFC 2543 (Request For Comments) of the IETF (Internet Engineering Task Force).

With the aim, in particular, of hiding these differences and enabling terminals using different protocols to coexist, as is known from the prior art, protocol gateways can be placed between the various terminals.

Typically, these protocol gateways form part of call centers or controllers.

FIG. 1 schematically illustrates an example of setting up a multimedia session between two telecommunication terminals.

Terminal $T_A$ is the initiator of the multimedia session. It therefore initiates a multimedia session setup negotiation $m_A$ with the call center CC that has a protocol gateway. This multimedia session setup negotiation contains, in particular, information on the media characteristics which terminal $T_A$ can handle (video format, voice encoding type, etc.) and is compliant with the H.323 protocol.

The call center CC then negotiates with the recipient of the multimedia session, that is terminal $T_B$, by exchanging messages $m_B$ according to the SIP protocol, and then it sets up the multimedia session MS between the two terminals $T_A$ and $T_B$.

If necessary, if the two terminals cannot agree upon media characteristics to communicate (for example, they do not support any common video encoding format), the call center may set up the multimedia session using a media gateway.

However, there is a problem if one of the two terminals uses the H.323 protocol and the other terminal (or the other terminals in the case of a multimedia session between more than two participants) uses a protocol other than H.323 (for example, the SIP protocol).

This is because the H.323 protocol includes a phase to determine a "master" terminal and a "slave" terminal. The protocol assumes that each terminal can take on either role. The determination depends on a classification, established beforehand, of various types of terminal: the most powerful terminal takes on the role of "master" and for equal power, an arbitrary choice is made to determine which of the two terminals will assume the role of master.

This role of master is taken into account in the event of conflicts or problems. It involves a significant degree of complexity in the terminal implementing it.

In the case in which a multimedia session is set up via a protocol gateway and in which only one terminal uses the H.323 protocol, a problem arises since the phase for determining the "master" and "slave" roles can take place only between the terminal using the H.323 protocol and the protocol gateway.

Referring again to the example of FIG. 1, this means that the determination of the "master" and "slave" roles must take place between terminal $T_A$ and the call center CC containing the protocol gateway.

In accordance with the H.323 protocol, this mechanism therefore assumes that the protocol gateway can take on the role of "master". The gateway must therefore support all the protocol and software mechanisms inherent to this function.

Since these mechanisms are complex, this type of solution involves an increase in processing resources required to enable the protocol gateway to function (memory resources, CPU (Central Processing Unit), etc.).

Moreover, since this protocol gateway is typically included in a call center, this use of resources can be to the detriment of other functions in the call center.

Furthermore, the architecture of Internet type data networks involves, generally, minimizing the processing resources required within the network, since the lifetime of the hardware within the network is assumed to be greater than that of the terminals and any increase in resources required and any update is expensive and to be avoided.

Thus, in Internet type networks, a large part of the intelligence is transferred to the terminals.

The result of this is that the increase in complexity of the protocol gateway is a major drawback.

BRIEF SUMMARY OF THE INVENTION

The aim of the present invention is to propose a protocol gateway for setting up multimedia sessions between a terminal using the H.323 protocol and a terminal using another protocol, but not requiring implementation of the role of "master".

To achieve this, a first subject of the invention is such a protocol gateway for setting up multimedia sessions between a first terminal, using a first protocol (for example the ITU-T H.323 protocol), and a second terminal, using a second protocol, the first protocol requiring determination of a master. This protocol gateway is characterized in that it has available to it means for forcing the first terminal to assume the role of master.

Another subject of the invention is a call center including such a protocol gateway.

Another subject of the invention is a process for setting up a multimedia session between a first terminal using a first protocol (for example the ITU-T H.323 protocol), and a second terminal, using a second protocol, the first protocol requiring determination of a master, the first and second terminals communicating by means of a protocol gateway. This process is characterized in that it includes steps of:

sending of a message to determine the Master/Slave status.

sending of a response message by the protocol gateway, containing a field forcing the first terminal to assume the role of master.

BRIEF DESCRIPTION OF THE DRAWINGS

The invention, its features and its advantages will become more clearly apparent in the description below of an implementation given with reference to the attached figures.

FIG. 1, already referred to, schematically illustrates the setting up of a multimedia session between two terminals.

FIG. 2 illustrates the phase for determining the role of master between a terminal and a protocol gateway.

DETAILED DESCRIPTION OF THE EXEMPLARY EMBODIMENTS OF THE INVENTION

In the example of FIG. 2, the call center CC includes a protocol gateway G. The purpose of this protocol gateway is to allow multimedia sessions to be set up between terminals that do not use the same protocol.

Terminal $T_A$ uses the H.323 protocol. This terminal wants to set up a multimedia session with one or more other terminals, not depicted in the figure, which use protocols other than H.323. As mentioned previously, the SIP protocol may feature here.

First, terminal $T_A$ transmits to the protocol gateway G a message $m_1$ for determining the Master/Slave status.

In accordance with the H.323 protocol, this message is a "MasterSlaveDetermination". It contains as a parameter, first the terminal type terminalType, and secondly a random number, statusDeterminationNumber.

As indicated in section 6.2.8.4 of ITU-T Recommendation H.323, the terminal type is a number that is representative of its processing power.

In the prior art, the processing power is used to determine which party in a multimedia session should be chosen as master.

The random number statusDeterminationNumber is used as the means of arbitration when both parties are of equal power.

In accordance with the invention, the protocol gateway G responds to the message $m_1$ by transmitting a message $m_2$. This message $m_2$ is a "MasterSlaveDeterminationAck" message.

Regardless of the processing power and the random number indicated in the message $m_1$, the protocol gateway G decides to take on the role of slave, forcing the terminal $T_A$ to assume the role of master.

To this end, the gateway sets the "Decision" parameter, as defined in ITU-T Recommendation H.245, to the value "Master".

On receiving this message $m_2$, terminal $T_A$ may respond with a message $m_3$. This message $m_3$ is also a "MasterSlaveDeterminationAck" message. This time, the parameter XXX contains the value "Slave", indicating that terminal $T_A$ accepts that the protocol gateway G takes on the role of slave.

Thus, the protocol gateway G is freed from management of the role of master, while terminal $T_A$ is unaffected. For terminal $T_A$, everything takes place as a normal dialog with another terminal.

Furthermore, it should be noted that in accordance with Recommendation H.323, the terminals must implement management of the role of master, such that the mechanism of the invention does not have any additional constraint on these terminals.

The invention claimed is:

1. A call center comprising a protocol gateway for setting up multimedia sessions between terminals;
    wherein said gateway facilitates communication between a first terminal and a second terminal;
    said first terminal which uses a first protocol, said first protocol requiring determination of a master,
    said second terminal which uses a second protocol,
    wherein said first terminal is forced to assume the role of master regardless of processing powers of said first terminal and said protocol gateway; and
    wherein said protocol gateway is included in the call center.

2. The call center as claimed in claim 1, in which said first protocol is the ITU-T H.323 protocol.

3. The call center as claimed in claim 2, in which said gateway is able to return a "MasterSlaveDeterminationAck" message in response to a "MasterSlaveDetermination" message, containing a "Decision" field set to "Master".

4. The call center as claimed in claim 1, in which said second protocol is the SIP protocol.

5. A process used in a call center for setting up a multimedia session between a first terminal using a first protocol and a second terminal using a second protocol, said first protocol requiring the determination of a master, said first and second terminals communicating by means of a protocol gateway, the process comprising:
    sending of a message $m_1$ from said first terminal to said protocol gateway of said call center to request determining a master/slave status, and
    sending of a response message $m_2$ by said protocol gateway of said call center to said first terminal, containing a field forcing said first terminal to assume a role of master.

6. The process as claimed in claim 5, in which said first protocol is the ITU-T H.323 protocol.

7. The process as claimed in claim 5, in which said response message is a "MasterSlaveDeterminationAck" message containing a "Decision" field set to "Master."

8. The call center as claimed in claim 1, wherein said protocol gateway responds, to a message requesting determining a master/slave status from said first terminal, with a message acknowledging that said gateway takes on a role of a slave, forcing said first terminal to assume the role of master.

* * * * *